United States Patent [19]
Anderson

[11] 3,710,214
[45] Jan. 9, 1973

[54] PLURAL MOTOR TIMING SEQUENCE SYSTEM

[76] Inventor: Wallace G. Anderson, 981 Route 23, Wayne, N.J. 07470

[22] Filed: May 4, 1971

[21] Appl. No.: 140,217

[52] U.S. Cl. ..............................................318/102
[51] Int. Cl. .............................................H02p 1/58
[58] Field of Search.....................................318/102

[56] References Cited

UNITED STATES PATENTS 2,782,350  2/1957  Clark....................................318/102
3,191,114  6/1965  Reed..................................318/102 X

*Primary Examiner*—T. E. Lynch
*Attorney*—Samuel Stearman

[57] ABSTRACT

A system for starting a plurality of motors sequentially, which operates in such a manner that each motor will not start until the previously started motor has come to full speed and acquires normal current flow. The timing sequence system hereof is connected in the control circuit of the motors associated with the system and is thereby not subject to the high voltage and current requirements which characterize the motor power circuit.

11 Claims, 4 Drawing Figures

INVENTOR
WALLACE G. ANDERSON

BY
Samuel Stearman
ATTORNEY

INVENTOR
WALLACE G. ANDERSON

PLURAL MOTOR TIMING SEQUENCE SYSTEM

BACKGROUND OF THE INVENTION

1. Field of the Invention

This invention relates to a timing sequence system for starting a plurality of motors and more particularly to a timing sequence system arranged to enable the surges of power attending the start of each motor to be completed before the next motor can start.

2. Description of the Prior Art

Prior art timing sequence systems with a plurality of motors are characterized by the fact that the systems operate off of line current used to operate the motors. The chief disadvantage, among others, of this type of system is that the components must be designed to be compatible with the line current. In most instances, this requires large capacity components which are relatively expensive. Furthermore, such systems being subjected to large currents and high voltages, render the components susceptible to frequent failure. Manifestly, failure of the components in these types of systems require the complete shut-down of the motor, since the line current is also used to operate the sequence system.

SUMMARY OF THE INVENTION

This invention comprises a timing sequence system for sequentially starting motors. The system has wide application and may be used with motors utilized for operating air conditioners, compressors for food freezers in supermarkets, and any other motor-operated equipment or devices.

In accordance with the invention, the sequential operation of the motors is timed in such a manner that a motor will not start until the motor previously started has completed the inductive surges caused by its start, and it has reached full speed and is drawing the normal amount of current from the power source. Thus, the system embodying the invention will prevent damage to the motors because of insufficient current and will reduce the demand rate compared to that which is incurred by using starting surges which occur when all the motors associated with the system are started at one time.

The primary object of the invention is to provide a sequential timing system for sequentially starting a plurality of motors in such a manner that each motor will not start until the previously started motor has completed drawing inductive surges from the line and has reached its full speed and returned to drawing a normal amount of current.

It is another object of this invention to provide a timing sequence system in the motor control circuit, whereby comparatively low level voltage and current components may be used.

It is still another object of this invention to provide a timing sequence system for starting a plurality of motors, which includes a holding means for maintaining the operation of a motor once started, regardless of the status of the timer associated with the system.

It is still another feature and advantage of the invention that the control circuits hereof enable any sequence timer to be adapted to the complete timing system, and that when the control circuits are connected, as herein set forth, to a sequence timer, they will start any electric current consuming device that can be operated from a relay.

The primary or central feature of this invention lies in the fact that the time sequencing mechanism is connected in the control circuit of the motor, as opposed to being connected in the power circuit, such as is the case in the prior art devices. By being connected in the control circuit, the system may operate on low level voltage and current. Hence, low cost, highly reliable electric components may be used in the operation of the system.

The system comprises a timer switch connected in series with the control switches in a plurality of motor control circuits. The timer may, for example, comprise a motor driven arm which completes, one at a time, circuits through a pair of contacts connected in each motor control circuit. The timer motor is driven at a speed such that the time interval between the completing of circuits through successive pairs of contacts is equal to the time required for the completion of the inductive current surges caused by the starting of a motor, and for the motor to reach full speed and return to drawing normal line current. The system also includes, in each motor control circuit, a holding means, such as a dropping resistor, for maintaining the operation of a motor relay in the control circuit, after the circuit through the timer has been broken. The system is so configured that coincident operation of a control switch and completion of a circuit through an associated set of timer contacts is required to energize the associated motor relay and thereby start the associated motor.

A further feature and advantage of the invention resides in the fact that motors of different voltage and current ratings may be employed with this timing sequence system, using the same timer.

DETAILED DESCRIPTION OF THE PREFERRED EMBODIMENT

Figure 1:
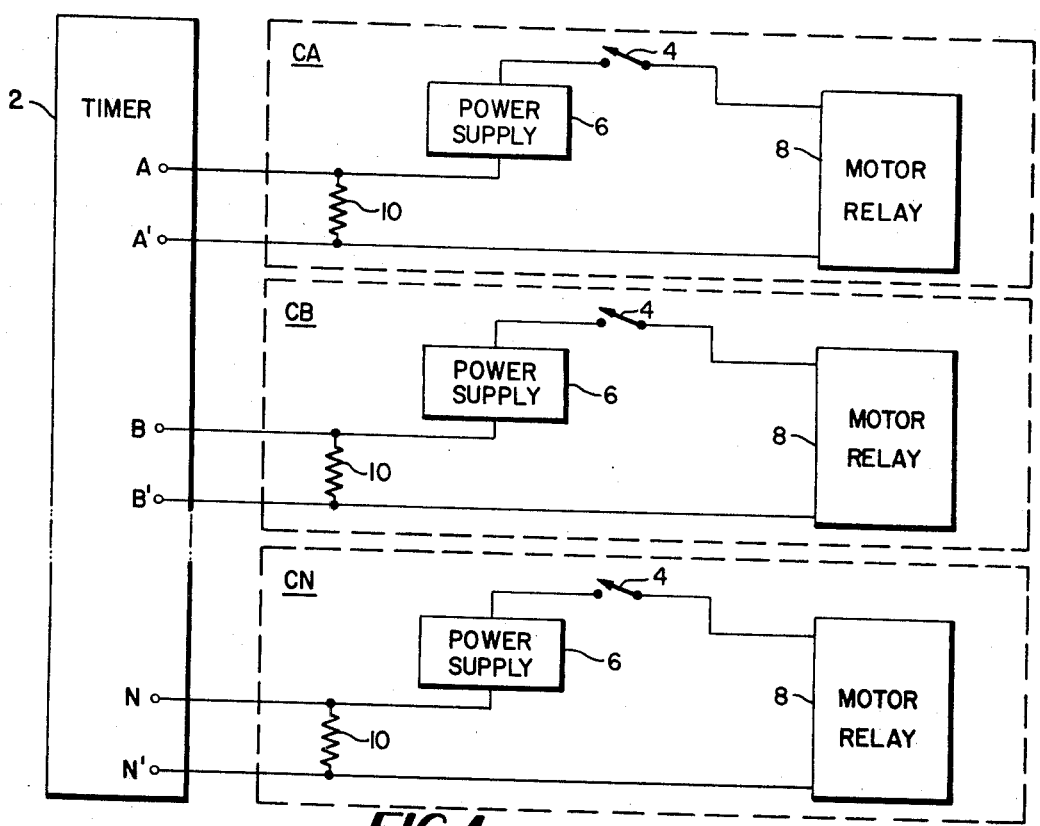
FIG. 1 shows a block diagram of a preferred embodiment of a motor timing sequence system in accordance with the present invention.

A preferred embodiment of motor starting timing sequence system in accordance with the present invention is depicted in FIG. 1.

Timer 2 has a plurality of sets of contacts A,A'; B,B'; through, say N,N'. Across each set of the contacts there is connected a control circuit, these being designated CA, CB through CN, respectively. Each motor control circuit comprises a thermostat or control switch 4, a power supply 6, a motor relay 8, and a dropping resistor 10. Power supply 6 is a low voltage supply, relative to the motor power supply. The control circuits CA–CN operate only on low voltage and current.

The cycle for starting a motor is initiated by the closing of the control switch or thermostat contact 4. When timer 2 completes the circuit across contacts A,A', the motor relay 8 will be energized, thereby causing the operation of the associated motor. Dropping resistor 10 will allow sufficient current to flow through the control circuit CA, such that operation of the associated motor will be maintained after contacts A,A' of timer 2 have been reopened. Dropping resistor 10 is of such a value that the current flowing therethrough is not sufficient to energize motor relay 8, but is sufficient to maintain energization once motor relay 8 has been energized.

Contacts A,A' and B,B' of timer 2 are related in such a manner that the time between the completion of a circuit across contacts A,A' and the completion of a circuit across contacts B,B', is sufficient to allow the motor control circuit CA to complete the inductive surges in the line current caused by the starting of the motor, and to allow the motor to attain its full running speed and to draw a normal line current. In this manner, the sequence of the starting of the motors controlled by control circuit CA, CB and CN will assure that no two motors will be in their starting cycles during the time period.

Figure 2:
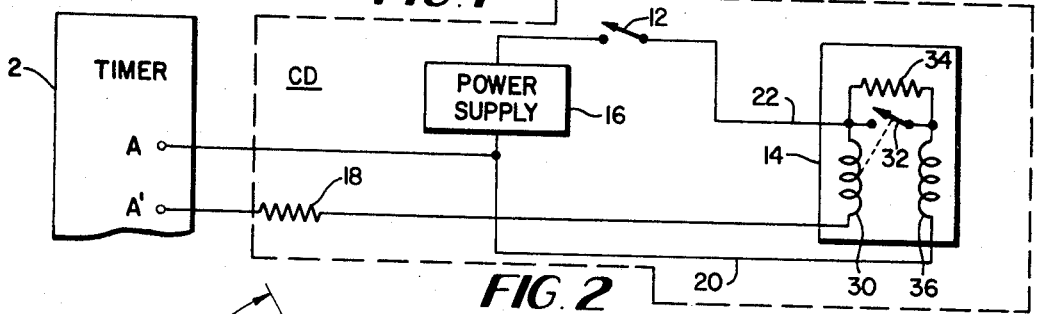
FIG. 2 shows a diagram of a control circuit in connection with another preferred embodiment of this invention.

FIG. 2 shows another embodiment of a control switch CD which may be used in the present invention. Referring to FIG. 2, timer 2 has contacts A,A' associated with motor control circuit CD. Switch 12 is a thermostat or motor control switch for operating the motor controlled by motor relay circuit 14. The control circuit also includes power supply 16 and dropping resistor 18. Power supply 16 is a low voltage supply. The motor relay control circuit 14 includes a control relay 30 which operates switch 32. Dropping resistor 34 is connected in parallel with switch 32, and motor relay 36 is connected in series with the parallel connection.

The starting cycle of the motor controlled by control circuit CD is initiated by the closing of switch 12. When the timing cycle of timer 2 completes the circuit across contacts A,A' the motor control circuit will be completed and control relay 30 will be energized, thereby closing switch 32. The circuit, including switch 12, power supply 16, line 20, motor relay 36, dropping resistor 34 and line 22, acts as a holding circuit to maintain the operation of motor relay 36 after contacts A,A' have been opened as timer 2 cycles.

As will be seen from FIG. 2, this circuit is arranged in a manner such that upon the closing of contact 12, resistor 34 will prevent the flow of sufficient current to energize relay 36. However, once motor relay 36 has been energized by the closing of the circuit, which includes switch 12, power supply 16, timer 2, dropping resistor 18, motor relay 36 and power line 22, the holding circuit will maintain the operation of motor relay 36.

As can readily be seen, the motor control circuits shown in FIG. 2 may be used in lieu of the motor control circuits shown in FIG. 1. Furthermore, the motor control circuit of FIG. 2 may be used in lieu of some of the motor control circuits of FIG. 1, while the remaining control circuits of FIG. 1 remain unchanged.

It may here be further pointed out that in the system embodying the present invention, high voltage connections are confined to the motors, and only low-control voltages pass through the timer.

Figure 3:
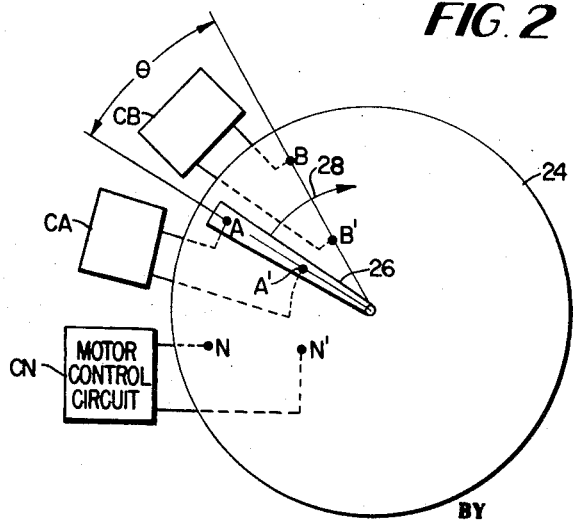
FIG. 3 is a diagrammatic view of a timer for use with the present invention.

FIG. 3 shows one embodiment of a timer which may be used as the timer 2 diagrammatically indicated in FIG. 1. This timer consists of a plurality of sets of contacts A,A', B,B', N,N' mounted on a plate 24. As these contacts are connected into motor control circuits CA, CB and CN, respectively, an electrically conductive arm 26 is rotated by a timer motor (not shown) in the direction of arrow 28. Contacts A,A' and B,B' are so positioned with respect to each other that the time required for arm 26 to rotate through the angle indicated by the symbol theta, is equal to or slightly greater than the time required for the completion of inductive surges caused by the starting of a motor and the reaching of full speed operation and drawing of normal line current by the motor controlled by control circuit CA.

Figure 4:
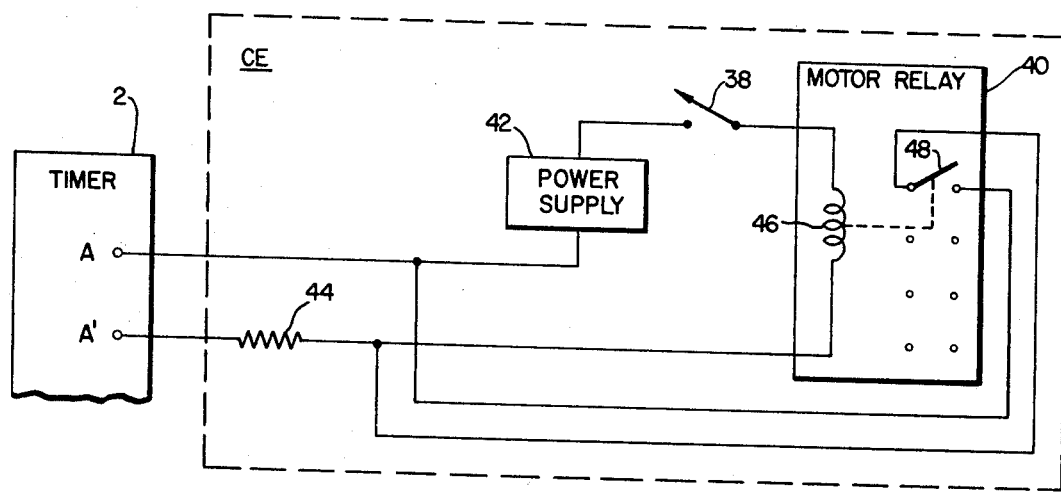
FIG. 4 shows a diagram of a control circuit in connection with another preferred embodiment of this invention.

FIG. 4 shows another embodiment of a control switch CE which may be used in the present invention. Referring to FIG. 4, timer 2 has contacts A,A' associated with the motor control circuit CD. Switch 38 is a thermostat or motor control switch for operating the motor relay circuit 40. The control circuit also includes a power supply 42 and a dropping resistor 44. The motor relay circuit 40 includes a control relay 46 which operates normally open switch 48.

When switch 38 is closed concurrently with the completion of a circuit across contacts A,A' of timer 2, relay 46 is energized, thereby closing normally open switch 48. Once relay 46 is energized, it is held energized by a circuit from power supply 42, through switch 38, relay 46, switch 48 and the return path to power supply 42. This circuit is independent of timer 2 and will therefore remain energized until switch 38 is opened.

As can be seen, the motor control circuit shown in FIG. 4 can be used in lieu of or in conjunction with the motor control circuits shown in FIGS. 1 and 2.

Any conventional or suitable timer may be used for the timer 2. The only requirement for the timer is that the time delay between the completion of successive circuits be sufficient to permit the completion of inductive surges and the reaching of full speed operation by each motor in the system, prior to the closing of the circuit for starting a successive motor in the system.

Although an electromechanical timer is shown in the preferred embodiment, it would be well within the knowledge of those with ordinary skill in the art to use any form of solid state timer, electronic timer, or industrial timers, in lieu thereof.

As hereinabove stated, the timing sequence system embodying the invention may be used with motors employed for operating air conditioners, compressors, and other motor-operated equipment or devices. As will be evident from the above description of the system and its mode of operation, it may also be readily used to sequentially start the individual units of heating systems or those of lighting systems. It is apparent, therefore, that the timing sequence of the present invention is applicable to all power-consuming devices using amounts of electricity to start the devices that are greater than the amount required to run them.

It is a further advantage of the system hereof that it can be employed to permit lighter cables to connect the main power source and the individual devices, since the starting power required is considerably reduced.

What is claimed is:

1. A timing sequence system for sequentially starting a plurality of electrical devices, comprising:

a. a control circuit means associated with each of said devices for controlling the operation of said device, said control circuit means including a power supply means having an output voltage which is low relative to the power supply of said electrical devices, whereby said control circuit means is a low voltage circuit; and b. timer means connected to said control circuit means for sequentially closing each of a plurality of sets of contacts in said control circuit means, each of said sets of contacts being associated with one of said devices, said timer means being arranged to effect said sequential closing by the actuation of said control circuit means and the coincident closing of one of said sets of contacts associated with the electrical device to be started, said timer means being effective to provide a time period between the closing of the successive sets of contacts equal at least to the time required for completion of current surges caused by the starting of said electrical devices, and for the said started one of said electrical devices to attain its normal running speed.

2. The system of claim 1 further including holding means for maintaining the operation of said electrical devices after the opening of the associated set of contacts of said timer means.

3. The system of claim 1 wherein each of said control circuit means includes a control switch and a relay in series with the corresponding set of contacts, whereby upon coincident closing of each of said control switches and its associated set of contacts, the respective circuit is completed through said relay and the associated relay is energized.

4. The system of claim 3, wherein said control switch comprises a thermostat.

5. The system of claim 3, wherein said control switch comprises a manually operated switch.

6. The system of claim 3, wherein said control switch comprises a timer operated switch.

7. The system of claim 2, wherein said holding means comprises a dropping resistor in parallel with each set of said plurality of sets of contacts.

8. The system of claim 7, wherein said resistor does not permit passage of current therethrough sufficient to energize said motor relay, but sufficient to maintain energization thereof once said motor relay has been energized.

9. The system of claim 2, wherein said holding means comprises:

a. a control relay in series with each set of said plurality of sets of contacts;

b. a normally open switch, said switch being closed by the energization of said control relay;

c. a dropping resistor in parallel with said switch; and d. a motor control relay in series with the parallel combination of said dropping resistor and said switch, whereby said motor relay is energized by the closing of said switch and said dropping resistor permits sufficient current to flow through said motor relay for maintaining its energization once it is energized.

10. The system of claim 1 wherein said timer means comprises:

a. a plurality of sets of contacts mounted on a plate; and b. a rotatable electrically conductive arm, said arm being mounted for sequentially completing a circuit across each set of said plurality of sets of contacts.

11. The system of claim 2 wherein said holding means comprises:

a. a control relay in series with each set of said plurality of sets of contacts;

b. a dropping resistor in series with each of said control relays and each set of said plurality of sets of contacts; and c. a normally open switch connected across the series circuit of each dropping resistor and each set of said plurality of sets of contacts, said normally open switch being closed by the energization of said control relay, whereby a holding circuit for said control relay is completed through said control circuit, said normally open switch in its closed position and said control relay.

* * * * *